(12) United States Patent
Gubbala et al.

(10) Patent No.: US 11,210,081 B2
(45) Date of Patent: Dec. 28, 2021

(54) CONFIGURING FIRMWARE FOR A TARGET DEVICE

(71) Applicant: Carrier Corporation, Palm Beach Gardens, FL (US)

(72) Inventors: Tulasi Laxmi Ganesh Gubbala, Telangana (IN); Sreeram Charan Kompalli, Telangana (IN); Srinivas Kotapalli, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/818,316

(22) Filed: Mar. 13, 2020

(65) Prior Publication Data

US 2020/0293303 A1 Sep. 17, 2020

(30) Foreign Application Priority Data

Mar. 15, 2019 (IN) .............................. 201911010185

(51) Int. Cl.
 *G06F 8/65* (2018.01)

(52) U.S. Cl.
 CPC ...................................... *G06F 8/65* (2013.01)

(58) Field of Classification Search
 USPC ......................................................... 717/169
 See application file for complete search history.

(56) References Cited

U.S. PATENT DOCUMENTS

| | | | |
|---|---|---|---|
| 6,247,919 B1 | 6/2001 | Welz, Jr. et al. | |
| 6,609,127 B1 * | 8/2003 | Lee ........................... | G06F 8/65 |
| 8,261,256 B1 * | 9/2012 | Adler .................... | G06F 1/1684 |
| | | | 717/173 |
| 9,599,345 B2 | 3/2017 | Mcafee et al. | |
| 9,610,518 B2 | 4/2017 | Kamen et al. | |
| 9,891,907 B2 * | 2/2018 | Searle ..................... | H04L 63/10 |
| 10,057,243 B1 | 8/2018 | Kumar et al. | |
| 10,111,552 B2 | 10/2018 | Wu | |
| 10,432,754 B2 | 10/2019 | Fisher et al. | |
| 2003/0079613 A1 | 5/2003 | Williamson | |
| 2003/0080116 A1 | 5/2003 | Williamson | |
| 2003/0083758 A1 | 5/2003 | Williamson | |
| 2003/0083770 A1 | 5/2003 | Williamson | |
| 2003/0084047 A1 | 5/2003 | Williamson | |

(Continued)

FOREIGN PATENT DOCUMENTS

| | | |
|---|---|---|
| CA | 2232314 C | 9/1998 |
| CA | 2231935 A1 | 9/1999 |

(Continued)

*Primary Examiner* — Qing Chen
*Assistant Examiner* — Clint Thatcher
(74) *Attorney, Agent, or Firm* — Cantor Colburn LLP (57) ABSTRACT

Aspects of the invention are directed towards systems for upgrading the firmware of one or more controllers in a system. One or more embodiments of the invention describe receiving an upgraded firmware for the supervisory controller and one or more associated controllers by the supervisory controller via a first interface. The supervisory controller identifies whether the firmware update is for the supervisory controller or for one or more associated controllers based on an identifier. The firmware update is transmitted to the supervisory controller and/or the one or more associated controllers based on the identification via a second interface.

17 Claims, 4 Drawing Sheets

(56) References Cited

U.S. PATENT DOCUMENTS

| | | | |
|---|---|---|---|
| 2007/0243495 A1 | 10/2007 | Crnkovich et al. | |
| 2008/0005406 A1 | 1/2008 | Odom et al. | |
| 2010/0058316 A1 | 3/2010 | Ha et al. | |
| 2010/0195991 A1 | 8/2010 | Deivasigamani et al. | |
| 2014/0034475 A1 | 2/2014 | Kamen et al. | |
| 2015/0301821 A1* | 10/2015 | Danne | H04L 67/06 717/169 |
| 2015/0342392 A1 | 12/2015 | Wu | |
| 2017/0078455 A1* | 3/2017 | Fisher | H04L 69/03 |

FOREIGN PATENT DOCUMENTS

| | | | |
|---|---|---|---|
| CA | 2465347 | A1 | 5/2003 |
| CA | 2465579 | A1 | 5/2003 |
| CA | 2465583 | A1 | 5/2003 |
| CA | 2465593 | A1 | 5/2003 |
| CA | 2465612 | A | 5/2003 |
| CA | 2530236 | C | 6/2007 |
| CA | 2684138 | A1 | 4/2010 |
| CA | 2875717 | A1 | 12/2013 |
| CA | 2843244 | A1 | 8/2014 |
| CN | 104538058 | A | 4/2015 |
| CN | 106020911 | A | 10/2016 |
| WO | 2017049134 | A1 | 3/2017 |
| WO | 2017197454 | A1 | 11/2017 |

* cited by examiner

CONFIGURING FIRMWARE FOR A TARGET DEVICE

FOREIGN PRIORITY

This application claims priority to India Patent Application No. 201911010185, filed Mar. 15, 2019, and all the benefits accruing therefrom under 35 U.S.C. § 119, the contents of which in its entirety are herein incorporated by reference.

TECHNICAL FIELD OF INVENTION

The present invention relates generally to firmware upgrade. More particularly, the invention relates to an apparatus and method for upgrading firmware of a device in an industrial plant.

BACKGROUND OF THE INVENTION

Existing multi-controller systems in an industrial plant do not have the capability to upgrade firmware on an industrial site where a control system is installed. Whenever an issue from the field trial is encountered, and if it can be fixed with a firmware patch, the multi-controller system installed on the site needs to be shipped back to factory for upgrade. If the product is installed in many locations across the globe and needs a firmware patch to fix any bug related to safety, critical or any other user scenario, the entire system needs to be shipped back to the factories. This results in wastage of the man power and significant transportation and other related costs.

In the existing art, a control system in an industrial plant will often communicate with controllers such as Programmable Logic Controllers (PLCs) at the site. These controllers typically perform a more specialized task associated with the plant target device. Commonly, data is transmitted between these controllers using different protocols, such as Supervisory Control and Data Acquisition (SCADA) protocols. However, these protocols lack security precautions against unauthorized commands or interception of data. Therefore, the safety of critical firmware in the controllers is mostly prejudiced.

The updating of firmware in a processing system is prone to errors and the entire firmware is often replaced. Thus, there is a need for the processing system which is immune to errors when updating firmware, in order to maintain functionality of a processing system. Further, the operation of the controllers are critical to operations of the plant and are therefore sensitive towards any unauthorized access to the firmware stored therein.

Therefore, there is a need in the art to develop methods and systems for upgrading the firmware of the system securely onsite.

SUMMARY OF THE INVENTION

Various embodiments of the invention describe method of upgrading firmware of controllers in a target device. The invention describes establishing a first communication channel between a resource and a target device. The target device comprises a supervisory controller and one or more associated controllers comprising a current firmware. The invention further describes identifying a firmware update for the supervisory controller and/or the one or more associated controllers based on an identifier and then receiving firmware update from the resource for the target device over a first communication channel. The current firmware of the supervisory controller and the one or more associated controllers can be upgraded. The confirmation of the upgrade is provided to the resource.

In another embodiment of the invention the one or more associated controllers can be upgraded through a second communication channel between the supervisory controller and the one or more associated controllers.

In yet another embodiment of the invention the first communication channel between the resource and the supervisory controller may comprise a RS485 connector. In another embodiment of the invention, the first communication channel may comprise a Universal Asynchronous Receiver/Transmitter (UART).

In another embodiment of the invention the first communication may comprise an Inter-Integrated Circuit (I2C), or a Serial Peripheral Interface (SPI), or Controller Area Network (CAN), or a Secure Digital Input Output (SDIO).

In still another embodiment of the invention, the supervisory controller is configured to detect the identifier confirming the firmware update for supervisory controller and/ or the one or more associated controllers before receiving the firmware update from the resource.

In another embodiment of the invention the identifier for identifying the firmware update for the supervisory controller and/or the one or more associated controllers may be associated with the firmware update.

In still another embodiment of the invention the establishment of the first communication channel between a resource and the target device indicates that the target device is in a bootloader mode for upgrading the firmware.

In yet another embodiment of the invention the one or more associated controllers enter a bootloader mode after receiving the instructions from the supervisory controller.

In another embodiment of the invention the second communication channel between the supervisory controller and each of the one or more associated controllers may comprise a Universal Asynchronous Receiver/Transmitter (UART).

In another embodiment of the invention the second communication channel may comprise an Inter-Integrated Circuit (I2C), or a Serial Peripheral Interface (SPI), or Secure Digital Input Output (SDIO) or a Local Interconnect Network (LIN) or a Controller Area Network (CAN).

In another embodiment of the invention a supervisory controller is disclosed for receiving an upgraded firmware for the supervisory controller and one or more associated controllers in a target device. The supervisory controller comprises a first interface for establishing a first communication channel to exchange data between a resource and a target device. The target device comprises the supervisory controller and one or more associated controllers comprising a current firmware. The supervisory controller comprises an identification unit to identify a firmware update for the supervisory controller and each of the one or more associated controllers based on an identifier. The supervisory controller further comprises a transmission unit to transmit the firmware update to the one or more associated controllers through a second interface.

In another embodiment of the invention the first interface is connected to the first communication channel comprising a RS485 connector, or a Universal Asynchronous Receiver/ Transmitter (UART), or a Serial peripheral interface (SPI), or a Secure Digital Input Output (SDIO).

In yet another embodiment of the invention, the establishment of the first communication channel indicates the supervisory controller to enter a bootloader mode, the supervisory controller informs each of the one or more associated controllers to enter a bootloader mode after the supervisory controller enters the bootloader mode.

In still another embodiment of the invention, the firmware update for the one or more associated controllers may be received from the resource and transmitted by the transmission unit to the one or more associated controllers.

In another embodiment of the invention, the second interface may be used to establish a second communication channel between the supervisory controller and each of the one or more of the associated controllers.

In another embodiment of the invention a target device comprising a supervisory controller and one or more associated controllers is disclosed. The supervisory controller receives firmware update from a resource over a first communication channel and communicates with each of the one or more associated controllers over a second communication channel. The supervisory controller comprises a first interface for establishing a first communication channel to exchange data between a resource and a target device. The target device comprises the supervisory controller and one or more associated controllers comprising a current firmware. An identification unit in the supervisory controller is configured to detect an identifier confirming the firmware update for the supervisory controller and/or the one or more associated controllers. The supervisory controller includes a transmission unit to transmit the firmware update to the one or more associated controllers through a second interface based on the identifier through a second interface.

In another embodiment of the invention, the firmware update received from the resource for the supervisory controller is stored in an internal memory of the supervisory controller.

In another embodiment of the invention the identification unit detects the identifier to determine the firmware update for the supervisory controller and/or one or more of the associated controllers.

In yet another embodiment of the invention the first communication channel may be established between the resource and the target device indicating that the target device is in a bootloader mode for upgrading the firmware. The one or more associated controllers enter the bootloader mode after receiving the instructions from the supervisory controller.

In various other embodiments of the invention a computer readable medium is disclosed comprising one or more processors and a memory coupled to the one or more processors. The memory stores instructions which are executed by the one or more processors to establish a communication between a target device and a resource. The target device comprises a supervisory controller and one or more associated controllers. A firmware update in the resource may be identified based on an identifier. The computer readable medium is configured to receive the identified firmware update from the resource to the target device in an internal memory of the supervisory controller and/or the one or more associated controllers. The current firmware of the supervisory controller and/or the one or more associated controllers can be upgraded with the identified firmware update and a feedback is sent to the resource confirming the upgrade.

In further embodiment of the invention the firmware update for the one or more associated controllers is transmitted through a second communication channel between the supervisory controller and each of the associated controllers.

In another embodiment of the invention the identifier is used to identify the firmware update for the supervisory controller and/or one or more of the associated controllers.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Described herein is the technology with systems, methods, and devices for upgrading the firmware of a multi-controller system to avoid any unauthorized access to the system during the firmware upgrade. In different embodiments of the invention the firmware for multiple controllers inside a target device is upgraded with a secured connection comprising a secure access.

Various embodiments of the invention describe upgrading the firmware of a multi-controller system using an on-site computer or host computer or a device or a resource comprising a firmware update. The firmware may be upgraded by a secure connection with a target device. The target device refers to a multi-controller system comprising multiple microcontrollers for performing various control operations alone or in combination. In various embodiments of the invention, one of the multiple controllers (supervisory controller and associated controllers) inside the target device functions as a supervisory controller. The host computer or the resource establishes a secure connection with the supervisory controller of the target device. The connection thus established may be referred to as a first communication channel. On establishing a secure connection, the supervisory controller enters a bootloading mode. The information of the connection with the resource is transmitted to the associated controllers. The associated controllers may enter in their bootloading modes after receiving instructions from the supervisory controller. Notably, the information of the connection to the associated controllers can also be selectively transmitted to specific controllers. The associated controllers with the information of the connection can enter in their bootloading modes. There exists a second communication to transfer data/instructions between the supervisory controller and each of the associated controllers.

The supervisory controller may identify the firmware update using an identification unit. The identification unit may detect an identifier associated with the firmware update before the firmware update is transmitted from the resource. The identification of the firmware update determines the controller for which firmware would be upgraded. The resource transmits the firmware update for the supervisory controller as well as for the one or more associated controllers in the target device via the secured connection established between the resource and the target device. The firmware update transferred to the target device is transmitted to the respective controllers (supervisory and associated controllers). In case it is determined that the firmware update is for the supervisory controller, the firmware of the supervisory controller is upgraded. Moreover, in case it is determined that the upgrading firmware is for another specific controller out of the associated controllers in the target device, the supervisory controller routes the upgrading firmware to the specific controller via a serial communication referred as a second communication channel directly. It is understood that the firmware update includes different upgrading firmwares for multiple controllers in the target device. It is also understood that the firmware update for the each of the one or more multiple controllers may be unique.

In another embodiment of the invention, two controllers in the target device are described. One of the controller functions as a supervisory controller and another controller functions as a main controller. A host computer comprises upgrading firmware for the main controller as well as the supervisory controller and may be referred to as a resource. A first communication channel may be established between the supervisory controller and the resource. On establishing a secure connection using the first communication channel, the supervisory controller enters a bootloading mode. Also, the supervisory controller transmits the information regarding the connection to the main controller. The main controller on receiving the information related to the connection from the supervisory controller may enter in it's bootloading mode. The supervisory controller identifies the firmware update to be transmitted from the resource based on an identifier which is associated with the firmware update. Accordingly, the firmware update is routed to the intended controller (either supervisory or the main controller). It is noted that the firmware update for the main controller is transmitted through the supervisory controller via a second communication channel. If the firmware update is identified o be for the supervisory controller, then the firmware update is transmitted to an internal memory of the supervisory controller for further upgrade. If it is identified that the firmware update is for the main controller, the firmware update is routed to the main controller via a serial connection between the supervisory controller and the main controller. The serial connection herein may be referred as a second communication channel. Thereafter, the main controller is upgraded with the firmware update.

In an embodiment of the invention, the supervisory controller identifies the firmware update for the main controller or the supervisory controller using an identifier. Particularly, an identification unit of the supervisory controller is used to identify an identifier associated with the firmware update before the firmware update is transmitted from the resource. The identification unit can be used to determine whether the firmware update is for the supervisory controller or the main controller. The use of the identifier is a significant feature related to the secure delivery of the firmware update.

In another embodiment of the invention, there can be a unique identifier for identifying the firmware update for the supervisory controller and the main controller. The use of the identifier can be understood as an authentic mechanism for determining the correct firmware update being provided to the correct controller. In another embodiment of the invention, the identification unit of the supervisory controller may attempt to map the identifier associated with the firmware update. On successful mapping of the identifier by the identification unit, the firmware update can be said to have been identified for a target controller (supervisory controller or the main controller).

The method and system of the present invention enables a secure upgrading of the firmware in respective microcontrollers. The invention describes upgrading different firmware for different microcontrollers in a target device via a secure access. The host computer or the resource transfers the firmware update via a secure connection to a supervisory microcontroller. It can be noted that the device can be a dedicated computer or a handheld device or any micro device capable of storing and transferring the firmware to the target device.

In an embodiment of the invention the resource is connected to the supervisory controller via a secure connection. The resource comprises firmware update along with the application software to transmit the upgrading software to the target device through the secure connection. In an exemplary embodiment of the invention, the application software on the host computer is operated by a user or a technician. In another embodiment of the invention, the technician determines whether the firmware of the supervisory controller as well as the other controllers in the target device have been successfully upgraded. The software application includes but is not limited to provisions to start, pause, and stop the transfer the firmware update to the target device. There may be a feedback to the resource regarding successful upgrade of the current firmware in the controller intended for upgrade.

In yet another embodiment of the invention, the communication between the host computer and the target device is secured using various security protocols. In an exemplary embodiment, a communication channel is established using a RS485 interface or RS422 or RS232 interface by the supervisory controller. In another embodiment of the invention, the supervisory controller uses the RS485 interface with a RS485 to UART converter within the target device to enable serial communication with the host computer. The UART converter is connected to a Registered-Jack (RJ) connector on the target device. It is to be noted that the RS485 to UART conversion is to change the RS485 logic levels to host computer or resource understandable logic. As known in the art, if the system has UART then a UART based convertor needs to communicate with the resource.

The target device may further include a RS485 to Universal Serial Bus (USB) converter to enable interfacing with the host computer using the USB. It is understood that RS485 to USB conversion is for changing the RS485 logic levels to host computer or resource understandable logic. In one embodiment of the invention by connecting the secure connection using a cable with the components such as RS485 to USB and further using the RS485 to UART converter, the supervisory controller enters in a bootloader mode. In other words, by connecting the cable, it is known to the supervisory controller that firmware update is available and the supervisory controller as well as the controllers associated with the target device may be upgraded.

In another embodiment of the invention, the connection between the resource and the target device can be a wireless connection. In an embodiment of the invention, a secure wireless connection can be used for exchange of firmware and data between the host computer and the target device. Examples of the wireless connection can be a Wi-Fi network with multi-level authentication for secure access. Other exemplary secure communication methods are also within the scope of the invention.

According to an embodiment of the invention, the supervisory controller is configured to enter into the bootloader mode when the communication channel referenced above is established between the target device and the host computer. It is to be noted that the supervisory controller further provides information to the one or more associated controllers to enter their bootloader mode while the communication channel such as a cable is connected between the resource and the supervisory controller. The supervisory controller further indicates the presence of one or more associated controllers with the supervisory controller in the target device. The indication may be provided to the host computer or resource via the cable connection. The technician operating the host computer can initiate transmission of the firmware update to the supervisory controller. In another embodiment of the invention the transmission of the firmware update can be initiated automatically at any specified time. Various methods of the transmission from the resource to the supervisory controller are within the scope of the present invention.

The firmware update is transmitted from the resource based on identification by the supervisory controller. The supervisory controller identifies the intended target controller for the firmware update by detecting an identifier associated with the firmware update. On determining the intended controller for the firmware update, the resource transmits the firmware update. If it is determined that the firmware update is intended for the supervisory controller, the firmware update can be stored in an internal memory of the supervisory controller where the supervisory controller can be upgraded thereafter. On the other hand, if the firmware update is not intended to upgrade the supervisory controller, the supervisory controller checks the firmware update if it is intended for one or more controllers in the target device. Accordingly, the firmware update is transmitted and routed to the one or more controllers through the supervisory controller. Alternatively, the firmware update for the supervisory controller and each of the one or more associated controllers can be transmitted one after the other. Once the firmware update of any of the controllers is successfully upgraded, firmware update for the next associated controller may follow.

In other words, the supervisory controller routes the firmware update from the resource to the intended associated controller. In one embodiment of the invention the firmware update to the intended associated controller is routed via a second communication channel which comprises a Serial Peripheral Interface (SPI) or an Inter-Integrated Circuit (I2C) Interface. The second communication channel may also comprise or a Secure Digital Input Output (SDIO), or a Local Interconnect Network (LIN), or a Controller Area Network (CAN), or a Universal Asynchronous Receiver/Transmitter (UART), as known to a person skilled in the art. Thereafter, the firmware update of the intended associated controller is upgraded. Once the firmware update is installed in the intended associated controllers, the entire target device may be restarted with the upgraded firmware. In another embodiment of the invention each of the one or more controllers may be individually restarted with the upgraded firmware. The feedback regarding the update of the intended controller is communicated back to the resource. The feedback may include the successful or unsuccessful upgrade of the supervisory and/or the associated controllers.

In another embodiment of the invention, there may be one or more associated controllers in the target device which are intended to be upgraded by the firmware update. In yet another embodiment of the invention the firmware update is different for different controllers in the target device. As an example, the firmware update of the supervisory controller is different from the firmware update for another controller in the target device. Similarly, the firmware update for a first controller and a second controller from one or more controllers in the target device may be different.

In an embodiment of the invention, the firmware update for the target device comprises but not limited to upgrading the current firmware of controllers in the target device; downgrading the current firmware of controllers in the target device; initializing the target device with configuration settings and software referred as factory settings; reinstalling the firmware of the target device with a new firmware entirely. The firmware update may be used to enhance product capabilities or to fix an issue within the current firmware. Various types of changes in the firmware of the controllers in the target device are within the scope of the invention.

Figure 1:
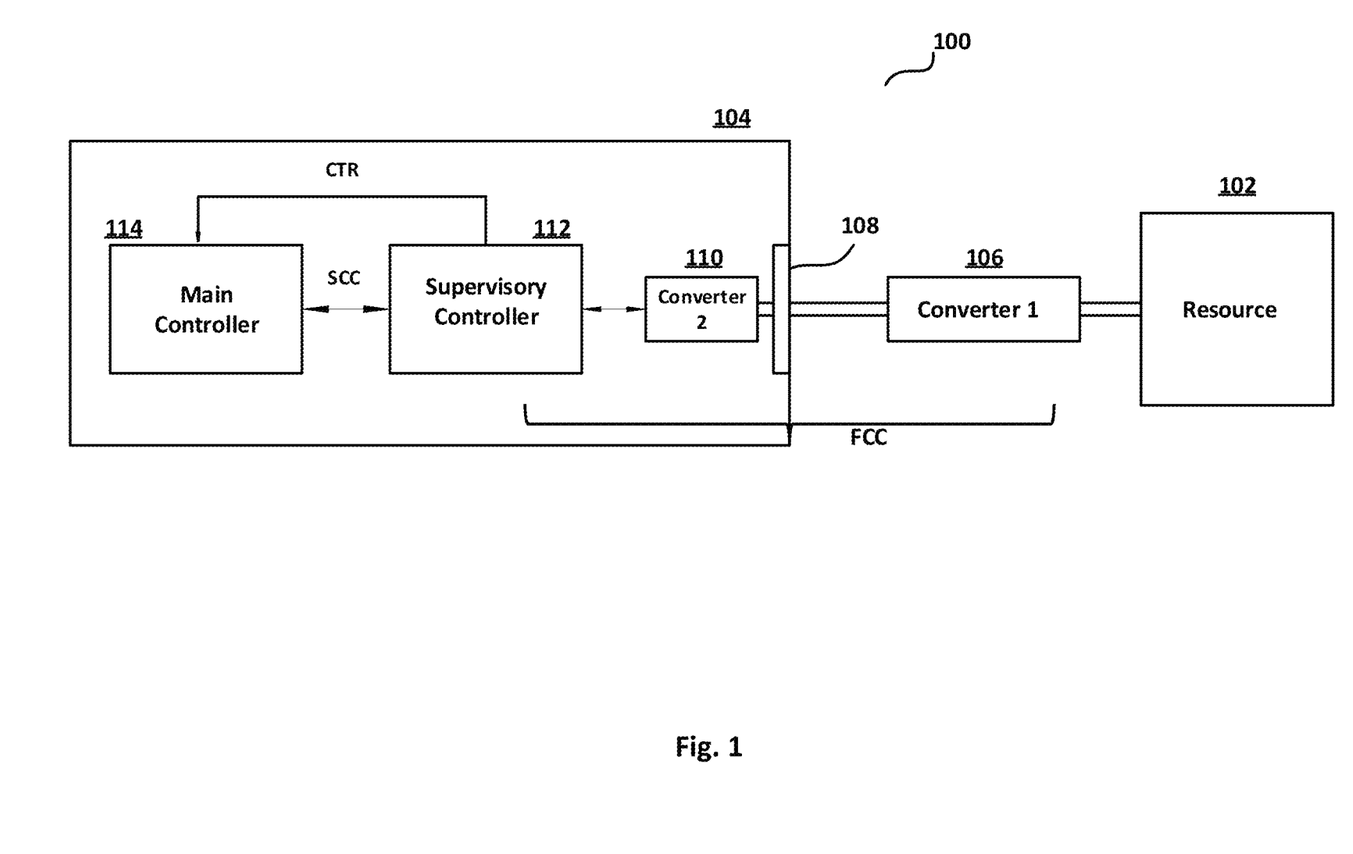
FIG. 1 is an exemplary block diagram illustrating different components of a system according to an exemplary embodiment of the invention.

FIG. 1 depicts a system 100 for upgrading the firmware according to one embodiment of the invention. A host computer or a resource 102 comprising firmware update for the target device may be communicably connected to a target device 104 via a first communication channel (FCC). The FCC may comprise a converter 1, 106 which is further connected to a supervisory controller 112 through a interface 108 and a converter 2, 110.

The host computer or a resource can be a desktop computer or a hand held device such as a user terminal or a smartphone with at least a display, a storage unit and with network connectivity. Example of the host computer or device includes a desktop, workstation PC, a laptop, a smart phone, a tablet, and the like. As an example, the host computer or device may be an Apple® desktop or smartphone, an Android® desktop or smartphone, a Windows® desktop or smartphone and/or the like. In another embodiment of the invention, the host computer or device is capable of storing the firmware update and a dedicated application program for transferring firmware update to the target device. In general, an operating system available on the host computer or the resource provides an interface for the user or technician to interact with the target device for firmware update. In an example, the operating system installed on the host computer or device is a Windows® based operating system, a Mac® based operating system, and a Linux® based operating system or any other operating system known in the art.

The target device 104 in FIG. 1 comprises an interface 108 and a converter 2 110 which are part of the first communication channel (FCC) and are connected with the supervisory controller 112. The supervisory controller 112 identifies the firmware update to be transmitted from the resource. A converter 1 is connected between the resource and the interface 108 of the target device 104. Accordingly, the firmware update from the host computer 102 is received through the connection 106-108-110 into an internal memory of the supervisory controller 112 or an internal memory of the main controller 114. The supervisory controller 112 may be connected to a main controller 114 via a second communication channel (SCC). The second communication channel comprises an interface viz. a Universal Asynchronous Receiver/Transmitter (UART), or an Inter-Integrated Circuit (I2C), or a Secure Digital Input Output (SDIO), or a Local Interconnect Network (LIN), or a Controller Area Network (CAN), or a Serial Peripheral Interface (SPI). The SCC is used to transmit the firmware update intended for the main controller 114 through the supervisory controller 112. The control operations between the supervisory controller and the main controller are performed via a control (CTR) or strobe. Further, the feedback of the successful upgrade of the firmware may be transmitted back from the main controller via the second communication channel to the supervisory controller which may further send it back to the resource via the first communication channel.

Figure 2:
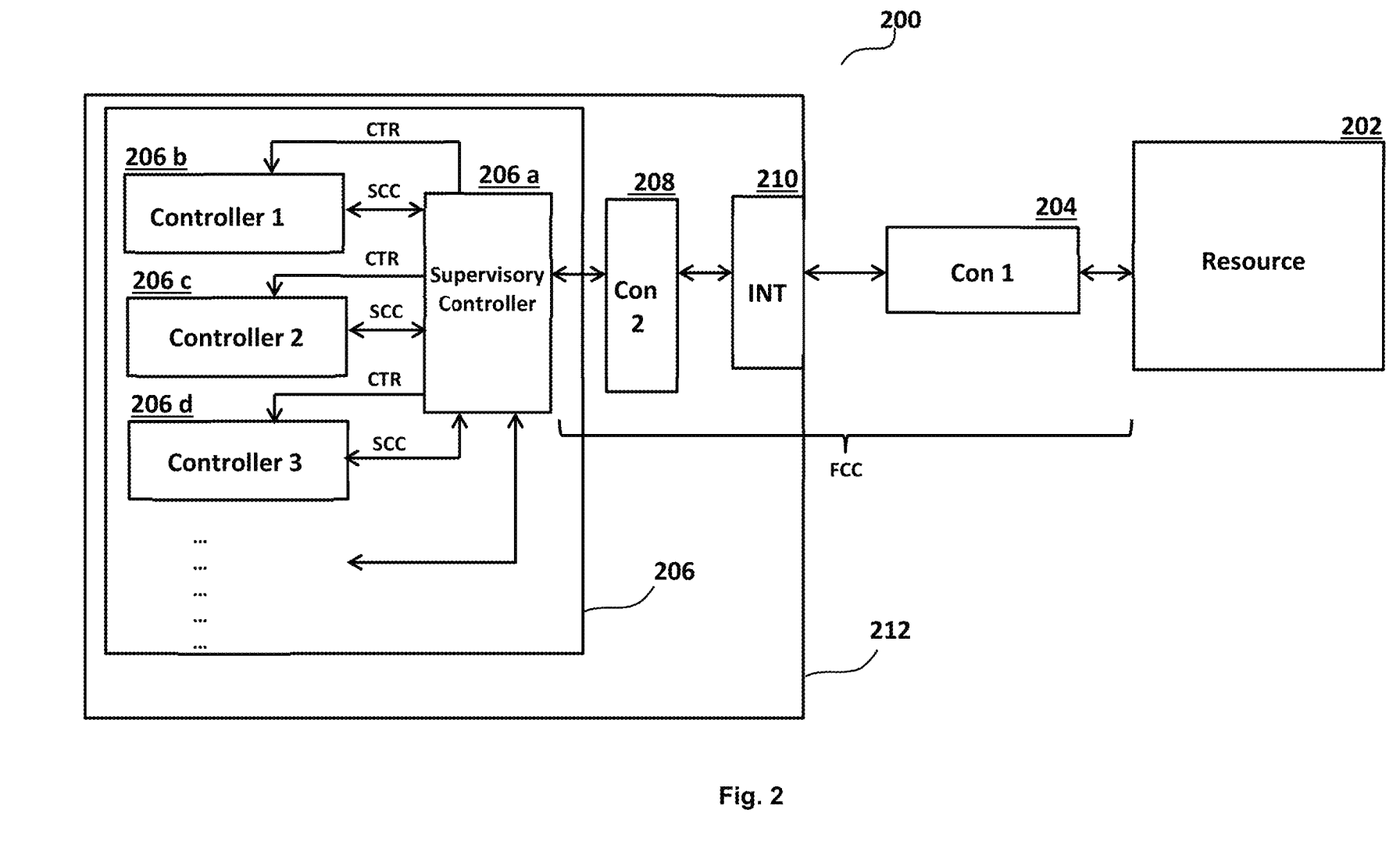
FIG. 2 is an exemplary block diagram of different components in a system with a supervisory controller and one or more associated controllers with the supervisory controller according to an exemplary embodiment of the invention

FIG. 2 depicts an embodiment of the invention with a system 200 to upgrade multiple controllers in a target device 212. The target device 212 includes number of controllers but at least one of them is designated as a supervisory controller 206a. The other controllers in the target device are designated as controller 1 206b, controller 2 206c, controller 3 206d, and so on. The number of controllers in the target device depends on the loading factor of the target device as known to a person skilled in the art. A resource 202 with firmware update for the multiple controllers has an application program to enable transfer of the firmware update from the resource 202 to the target device. Specifically, the supervisory controller 206a identifies the firmware update for different controllers before the firmware update is transferred from the resource. If it is identified that the firmware update is intended for the supervisory controller, the firmware update is transmitted to an internal memory of the supervisory controller. On the other hand if it is identified by the supervisory controller 206a that the firmware update is intended for other controllers, say controller 1, or controller 2, or controller 3 and so on, the firmware update is transmitted to an internal memory of the intended controller (controller 1, or controller 2, or controller 3 . . . ). It is to be noted that firmware update is transmitted through the supervisory controller even if it is intended for other controllers. In one embodiment of the invention, there exists a direct connection between the resource and the supervisory controller 206a. The resource 202 and the supervisory controller 206a are connected via a first communication channel (FCC). In another embodiment of the invention, the FCC comprises a converter 1 (Con 1), 204 which is further connected to a interface (INT), 210 of the target device. The FCC further comprises a converter 2 (Con 2), 208 connecting the interface (INT), 210 with supervisory controller 206a. The connection is intended to provide secure connection. Alternatively, a secure wireless connection can also be used for transferring the firmware update from the resource 202 to the supervisory controller 206a.

The firmware update for the supervisory controller and each of the one or more associated controllers can be transmitted one after the other or at the same time through the supervisory controller 206a. Once the firmware for any of the controllers is successfully upgraded, firmware update for the next associated controller may follow. The firmware update for any of the one or more associated controllers, 206b, 206c, 206d, can be transmitted from the supervisory controller 206a via a second communication channel (SCC) through the interfaces as discussed above.

Once the firmware is upgraded in the intended controller, a feedback is transmitted from the one or more associated controllers to the supervisory controller and further to the resource through first communication channel and the second communication channel respectively.

Figure 3:
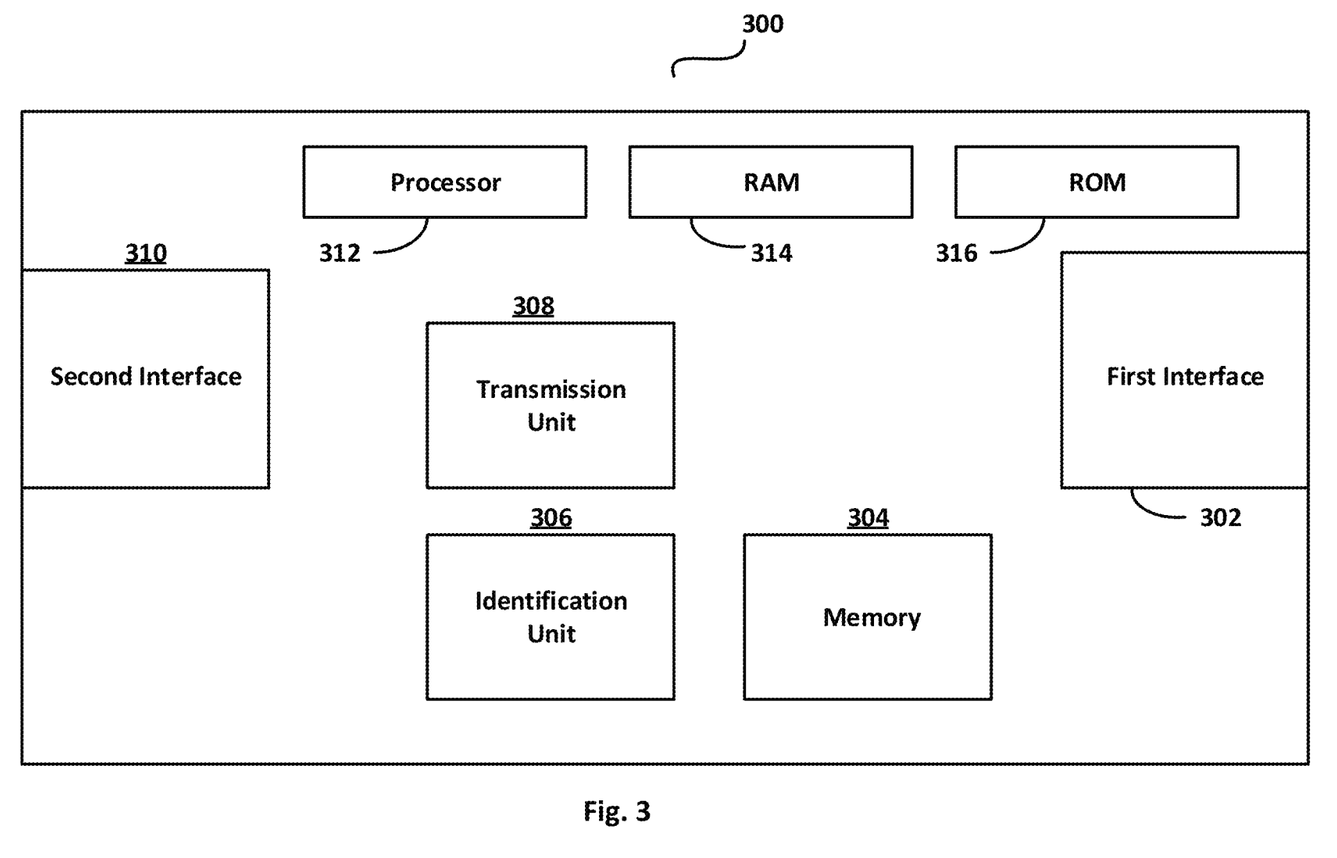
FIG. 3 is an exemplary block diagram of different components in a supervisory controller according to an exemplary embodiment of the invention.

FIG. 3 depicts the components of the supervisory controller 300 of the target device. It is to be noted that the supervisory controller 300 in FIG. 3 can be assumed as the supervisory controller 112 and 206a in FIG. 1 and FIG. 2 respectively. The supervisory controller comprises a processor 312, Random Access Memory (RAM) 314, Read Only Memory (ROM) 316 which work together to achieve different functions of the supervisory controller 300. Additionally, the supervisory controller 300 comprises a first interface 302 for receiving the firmware update from the host computer as discussed above. An identification unit 306 of the supervisory controller 300 determines whether the firmware update is intended for the supervisory controller 300 or any other associated controller in the target device. If it is determined that the firmware update is intended for the supervisory controller, then the firmware update is stored in the memory 304 of the supervisory controller. If it is determined that the firmware update in the resource is intended for the associated controllers, the firmware update is then routed through the supervisory controller via first interface 302 and then through the second interface 310 into the internal memory of the respective associated controller (intended controller). Thereafter, the firmware of the intended controller can be upgraded with the firmware update. Each of the different controllers in the target device has different firmware update which is identified by the identification unit 306 using an identifier. As discussed above, the identification unit of the supervisory controller may attempt to map the information related to the controllers with the identifier associated with the firmware update. Thus, the intended controller for the firmware update may be determined. A transmission unit 308 transmits the firmware update identified by the identification unit 306 via a second interface 310 to the intended one or more controllers in the target device.

Figure 4:
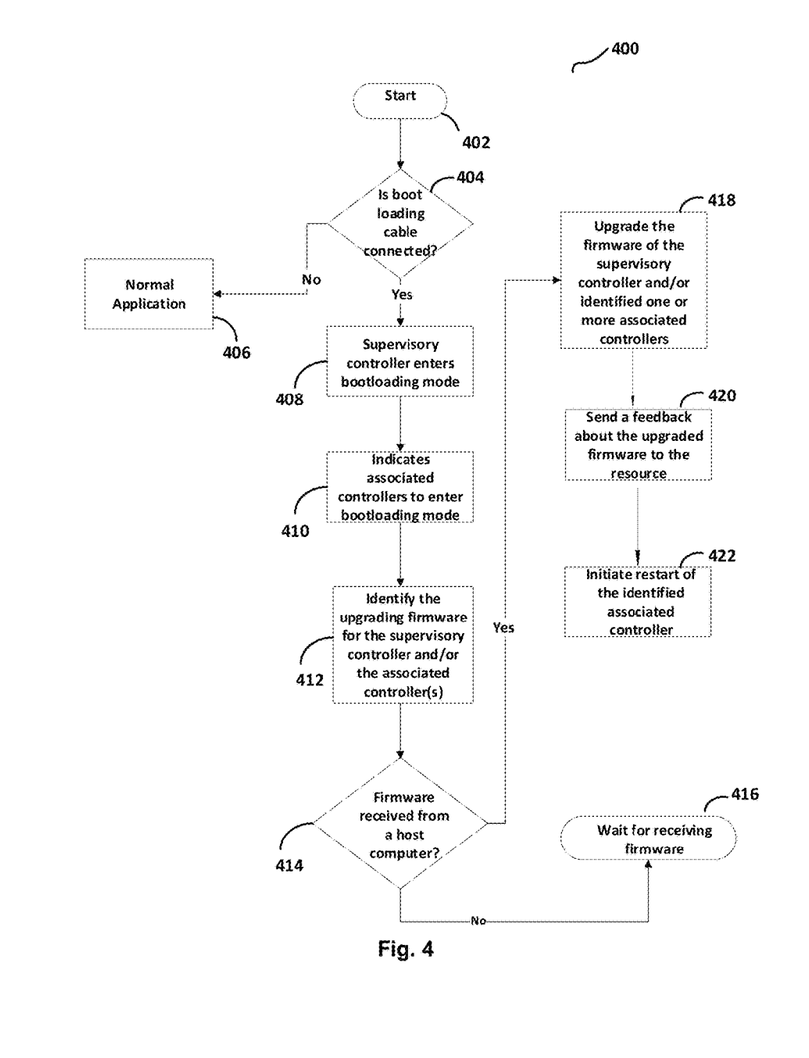
FIG. 4 is an exemplary flowchart illustrating a method to perform the invention according to an exemplary embodiment of the invention.

FIG. 4 depicts a flowchart outlining the features of the invention in an embodiment of the invention. The flowchart 400 describes a method being performed for enabling the invention. The method starts at 402 by establishing first communication channel, example, a bootloading cable between a resource and a target device 404. If the bootloading cable is not connected, the target device performs the normal application function 406. It is noted that the target device comprises a supervisory controller along with at least one associated controller. If the bootloading cable is connected, then the supervisory controller enters in a bootloading mode 408. When the supervisory controller enters the bootloading mode, it informs the at least one associated controller that the bootloading cable is connected and the at least one associated controller shall enter a bootloading mode. It is to be noted that in a bootloading mode the controller prepares to receive the firmware update from the resource. Further, it is understood to a person skilled in the art that the multiple associated controllers can be connected with the supervisory controller and information to enter the bootloading mode is sent to each of the associated controllers by the supervisory controller.

After entering the bootloading mode, the supervisory controller identifies 412 the firmware update from a resource. The intended controller for the firmware update is identified using an identifier associated with the firmware update. The supervisory controller waits to receive the firmware update from the host computer via the bootloading connection (cable) 414. In another embodiment of the invention a bootloading cable can be replaced with a secure wireless connection known in the art. If the firmware update is received, it is routed to the intended controller. If the firmware update is intended for the supervisory controller, it is stored in an internal memory of the supervisory controller as discussed in different embodiments of the invention above. If the supervisory controller identifies that the firmware update is intended for the associated controllers, the firmware update is routed to the intended controller through the supervisory controller. Accordingly, a current firmware of the intended controller is upgraded 418. A feedback is sent back to the resource regarding the successful/unsuccessful upgrade 420. Then, the supervisory controller and/or the at least one associated controller is restarted with the upgraded firmware 422.

As discussed earlier, the connection between the supervisory controller and the at least one controller can be referred as a second communication channel (SCC) for inter-controller communication. The second communication channel comprises various interfaces such as a Universal Asynchronous Receiver/Transmitter (UART), or an Inter-Integrated Circuit (I2C), or a Secure Digital Input Output (SDIO), or a Local Interconnect Network (LIN), or a Controller Area Network (CAN), or Serial Peripheral interface (SPI) for transmitting the firmware update as discussed above. The embodiment of the invention discussed herein is exemplary and various modification and alterations to a person skilled in the art are within the scope of the invention.

In one embodiment of the invention, the invention can be operated using the one or more computer readable devices. The one or more computer readable devices can be associated with the supervisory controller. The computer readable medium is configured to establish a communication between a target device and a resource. As discussed above, the target device comprises a supervisory controller and one or more associated controllers. The computer readable medium is further configured to identify a firmware update for the supervisory controller and/or the one or more associated controllers based on an identifier. It is identified whether the firmware update to be received by the supervisory controller is for upgrading the firmware of the supervisory controller or for upgrading the firmware of the one or more associated controllers. Accordingly, the firmware update for the supervisory controller and the associated controllers is transmitted based on the identification by the supervisory controller. In particular, the supervisory controller is configured to detect the identifier confirming the firmware update for the supervisory controller and/or the one or more associated controllers. If the firmware update is intended for the supervisory controller, the firmware update is transmitted in an internal memory of the supervisory controller and the supervisory controller is further upgraded using the firmware update. If the firmware update is intended for the one or more associated controllers, the firmware update is routed from the resource through the supervisory controller and then into an internal memory of the one or more associated controllers. The one or more associated controllers can thereafter be upgraded with the firmware update. After upgrading the firmware a feedback is sent back to the resource regarding the successful/unsuccessful upgrade.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

Further reference to any content has been made throughout the specification and words and phrases such as "controllers", "micro controllers", "industrial controllers", "microprocessors", or the like have been interchangeably used and means the controllers available in a target device whose firmware needs to be upgraded. Further, the firmware to be upgraded can also be in the form of executable computer program, executable files in computer format and other types of formats known in the art. Moreover, the words and phrases like "host", "computer", "user terminal", "host system", "device" or the like have been interchangeably used which means the computer or system having the firmware update for supervisory controller and one or more controllers to be upgraded therein.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising: establishing a first communication channel between a resource and a target device, the target device comprising a supervisory controller and one or more associated controllers comprising a current firmware; identifying a firmware update for the supervisory controller associated controllers based on an identifier; or the one or more wherein the supervisory controller is configured to detect the identifier confirming the firmware update for one of (i) the supervisory controller and (ii) the one or more associated controllers before receiving the firmware update from the resource; wherein, upon the identifier confirming the firmware update for the supervisory controller, receiving the identified firmware update from the resource to the target device in an internal memory of the supervisory controller and upgrading the current firmware of the supervisory controller with the identified firmware update unique to the supervisory controller; wherein, upon the identifier confirming the firmware update for the one or more associated controllers, receiving the identified firmware update from the resource to the target device in an internal memory of the one or more associated controllers and upgrading the current firmware of the one or more associated controllers the identified firmware update unique to the one or more associated controllers; wherein only one of the (i) the supervisory controller and (ii) the one or more associated controllers is updated with the firmware update; and providing a feedback to the resource confirming the upgrade.

2. The method of claim 1, wherein the one or more associated controllers are upgraded through a second communication channel between the supervisory controller and the one or more associated controllers.

3. The method of claim 1, wherein the first communication channel between the resource and the supervisory controller comprises a RS485 connector, or a Universal Asynchronous Receiver/Transmitter (UART), or a Serial Peripheral Interface (SPI), or a Controller Area Network (CAN), or a Secure Digital Input Output (SDIO).

4. The method of claim 1, wherein the identifier for identifying the firmware update for the supervisory controller and/or the one or more associated controllers is associated with the firmware update.

5. The method of claim 1, wherein establishment of the first communication channel between the resource and the target device indicates that the supervisory controller is in a bootloader mode for upgrading the current firmware.

6. The method of claim 2, wherein the second communication channel between the supervisory controller and each of the one or more associated controllers comprises or a Universal Asynchronous Receiver/Transmitter (UART), or an Inter-Integrated Circuit (I2C), or a Serial Peripheral Interface (SPI), or a Secure Digital Input Output (SDIO) or a Local Interconnect Network (LIN) or a Controller Area Network (CAN).

7. The method of claim 5, wherein the one or more associated controllers enter the bootloader mode after receiving the instructions from the supervisory controller.

8. A supervisory controller comprising: a first interface for establishing a first communication channel to exchange data between a resource and a target device, the target device comprising the supervisory controller and one or more associated controllers comprising a current firmware; an identification unit to detect an identifier confirming a firmware update for the supervisory controller or the one or more associated controllers; and a transmission unit to transmit the firmware update to the one or more associated controllers through a second interface based on the identifier-~wherein the supervisory controller is configured to detect the identifier confirming the firmware update for one of (i) the supervisory controller and (ii) the one or more associated controllers before receiving the firmware update from the resource; wherein, upon the identifier confirming the firmware update for the supervisory controller, receiving the identified firmware update from the resource to the target device in an internal memory of the supervisory controller and upgrading the current firmware of the supervisory controller with the identified firmware update unique to the supervisory controller; wherein, upon the identifier confirming the firmware update for the one or more associated controllers, sending the identified firmware update from the resource to an internal memory of the one or more associated controllers for upgrading the current firmware of the one or more associated controllers with the identified firmware update unique to the one or more associated controllers; and wherein only one of the (i) the supervisory controller and (ii) the one or more associated controllers is updated with the firmware update.

9. The supervisory controller of claim 8, wherein the first interface is connected to the first communication channel via a RS485 connector, or a Universal Asynchronous Receiver/Transmitter (UART), or a Serial peripheral interface (SPI), or a Controller Area Network (CAN), or a Secure Digital Input Output (SDIO).

10. The supervisory controller of claim 8, wherein the establishment of the first communication channel indicates the supervisory controller to enter a bootloader mode, wherein the supervisory controller informs each of the one or more associated controllers to enter the bootloader mode after the supervisory controller enters the bootloader mode.

11. The supervisory controller of claim 8, wherein the firmware update for the one or more associated controllers is received from the resource and transmitted by the transmission unit to the one or more associated controllers.

12. The supervisory controller of claim 8, wherein the second interface is used to establish a second communication channel between the supervisory controller and each of the one or more associated controllers.

13. A target device comprising: one or more associated controllers with a current firmware; a supervisory controller configured to receive a firmware update from a resource over a first communication channel and configured to communicate with each of the one or more associated controllers over a second communication channel; the supervisory controller comprising: a first interface for establishing a first communication channel to exchange data between the resource and the target device; an identification unit to detect an identifier confirming the firmware update for the supervisory controller . . . QL the one or more associated controllers; and a transmission unit to transmit the firmware update to the one or more associated controllers through a second interface based on the identifier through a second interface~wherein the supervisory controller is configured to detect the identifier confirming the firmware update for one of (i) the supervisory controller and (ii) the one or more associated controllers before receiving the firmware update from the resource; wherein, upon the identifier confirming the firmware update for the supervisory controller, receiving the identified firmware update from the resource to the target device in an internal memory of the supervisory controller and upgrading the current firmware of the supervisory controller with the identified firmware update unique to the supervisory controller; wherein, upon the identifier confirming the firmware update for the one or more associated controllers, receiving the identified firmware update from the resource to the target device in an internal memory of the one or more associated controllers and upgrading the current firmware of the one or more associated controllers the identified firmware update unique to the one or more associated controllers; and wherein only one of the (i) the supervisory controller and (ii) the one or more associated controllers is updated with the firmware update.

14. The target device of claim 13, wherein the firmware update received from the resource for the supervisory controller is stored in an internal memory of the supervisory controller.

15. The target device of claim 13, wherein the first communication channel is established between the resource and the target device indicating that the target device is in a bootloader mode for upgrading the firmware, wherein the one or more associated controllers enter the bootloader mode after receiving the instructions from the supervisory controller.

16. A computer storage medium storing instructions which are executed by one or more processors, the one or more processors configured to: establish a first communication channel between a resource and a target device, the target device comprising a supervisory controller and one or more associated controllers comprising a current firmware; identify a firmware update for the supervisory controller or the one or more associated controllers based on an identifier; wherein the supervisory controller is configured to detect the identifier confirming the firmware update for one of (i) the supervisory controller and (ii) the one or more associated controllers before receiving the firmware update from the resource; wherein, upon the identifier confirming the firmware update for the supervisory controller, receiving the identified firmware update from the resource to the target device in an internal memory of the supervisory controller and upgrading the current firmware of the supervisory controller with the identified firmware update unique to the supervisory controller; wherein, upon the identifier confirming the firmware update for the one or more associated controllers, receiving the identified firmware update from the resource to the target device in an internal memory of the one or more associated controllers and upgrading the current firmware of the one or more associated controllers the identified firmware update unique to the one or more associated controllers; wherein only one of the (i) the supervisory controller and (ii) the one or more associated controllers is updated with the firmware update; and providing a feedback to the resource confirming the upgrade.

17. The computer storage medium of claim 16, wherein the firmware update for the one or more associated controllers is transmitted through a second communication channel between the supervisory controller and each of the associated controllers.

\* \* \* \* \*